United States Patent
Everingham et al.

(12)
(10) Patent No.: US 6,505,610 B2
(45) Date of Patent: Jan. 14, 2003

(54) ENGINE INTAKE SYSTEM HAVING A HYDROCARBON COLLECTION PIT

(75) Inventors: Gary M. Everingham, Chatham (CA); Andre Veinotte, Blenheim (CA)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 10/075,998

(22) Filed: Feb. 14, 2002

(65) Prior Publication Data

US 2002/0179065 A1 Dec. 5, 2002

Related U.S. Application Data

(60) Provisional application No. 60/294,519, filed on May 31, 2001.

(51) Int. Cl.[7] .............................................. F02M 37/04
(52) U.S. Cl. ................... 123/516; 123/184.21; 123/518
(58) Field of Search ................ 123/184.21, 184.24, 123/184.57, 516, 518, 519

(56) References Cited

U.S. PATENT DOCUMENTS

| | | | | |
|---|---|---|---|---|
| 3,368,326 A | | 2/1968 | Hervert et al. ................. 55/161 |
| 3,541,765 A | | 11/1970 | Adler et al. .................. 55/316 |
| 3,572,013 A | | 3/1971 | Hansen et al. ................ 55/316 |
| 3,572,014 A | | 3/1971 | Hansen et al. ................ 55/316 |
| 3,678,663 A | * | 7/1972 | Hansen ....................... 55/387 |
| 3,747,303 A | | 7/1973 | Jordan ........................ 55/318 |
| 4,231,329 A | * | 11/1980 | Ishida ........................ 123/548 |
| 4,279,630 A | | 7/1981 | Nakamura et al. ............ 55/316 |
| 4,600,418 A | * | 7/1986 | Gommel et al. .............. 55/462 |
| 4,905,636 A | * | 3/1990 | Kronich ................ 123/195 HC |
| 5,235,938 A | * | 8/1993 | Haussmann et al. ........ 123/572 |
| 6,149,477 A | * | 11/2000 | Toyama ....................... 440/88 |
| 2002/0096148 A1 | * | 7/2002 | Trumpy et al. ............. 123/519 |

* cited by examiner

*Primary Examiner*—Thomas N. Moulis

(57) ABSTRACT

An engine intake system has an imperforate walled pit disposed at an elevation vertically below a bottom wall in a main passageway that contains an entrance opening into the pit. Gaseous, heavier-than-air, hydrocarbon that is migrating upstream within the main intake passageway from an engine end of the main passageway along the bottom wall toward the entrance opening will fall through the entrance opening into the pit upon encountering the entrance opening. A medium, such as activated carbon, disposed within the interior space collects gaseous hydrocarbon that has fallen into the pit.

25 Claims, 2 Drawing Sheets

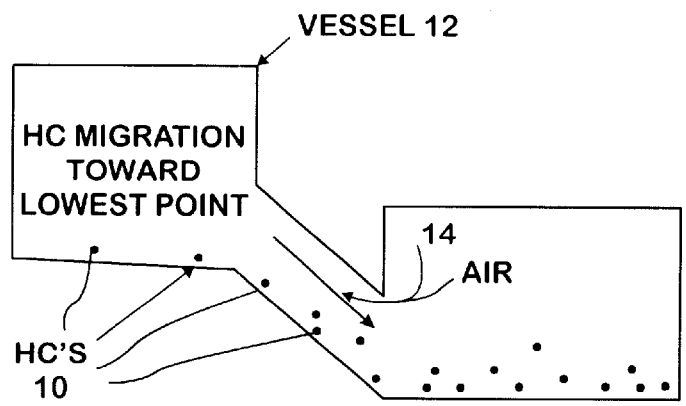
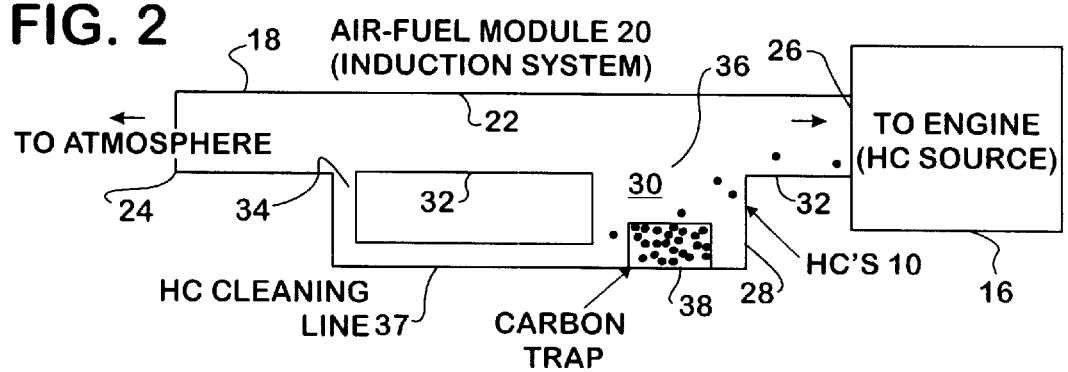

ENGINE INTAKE SYSTEM HAVING A HYDROCARBON COLLECTION PIT

REFERENCE TO A RELATED APPLICATION AND PRIORITY CLAIM

This application derives from the following commonly owned co-pending patent application, the priority benefit of which is expressly claimed: Provisional Application Ser. No. 60/294,519 filed on or about May 31, 2001 in the names of Gary M. Everingham and Andre Veionotte and entitled HYDROCARBON PIT FOR REMOVING HYDROCARBON EMISSIONS IN AN INDUCTION SYSTEM.

FIELD OF THE INVENTION

This invention relates generally to internal combustion engines, especially engines that power motor vehicles. More particularly the invention relates to an improvement in an automotive engine intake system for collecting certain hydrocarbon molecules that might otherwise escape to ambient atmosphere through the intake system when the engine is not running.

BACKGROUND OF THE INVENTION

It is desirable to prevent escape of unburned hydrocarbons from a motor vehicle that is powered by an internal combustion engine. Evaporative emission controls are associated with the fuel storage systems of gasoline engines to collect fuel vapors that might otherwise escape to the surrounding environment. In such a system vapors are collected in a vapor collection canister that is periodically purged to combustion chambers of the engine when the engine is running in order to combust the collected vapors in the engine. Collected vapors may pass through a portion of an engine intake system, such as an intake manifold, or module, before entering the engine combustion chambers.

Accordingly, another potential source of escape for such vapors to the surrounding atmosphere is through the engine intake system. Certain systems are presently under consideration for collecting certain hydrocarbons in an engine intake system before they can escape to atmosphere. One such system utilizes a carbon-based collection medium that is fixed in place in the intake system. However, for that system to be efficient in collecting hydrocarbons, it may impose a potentially undesirable restriction to combustion airflow through the intake system when the engine is running. Another system is one that utilizes a power actuator, electric or pneumatic for example, to move the collector into the airflow passageway for use and to remove it for non-use. The latter system requires not only the collection medium, but also the addition of the actuator.

The compositions of petroleum-derived gasolines vary to some degree, but they include mainly hydrocarbon chains that include from five to more than 25 carbon atoms (mostly octane whose chemical symbol is $C_8H_{18}$). Certain blended gasolines also include some type of alcohol, ethanol for example, which is simply a hydrocarbon characterized by the presence of a hydroxyl group (—OH). Hydrocarbons like ethanol and octane are much heavier than air. Air consists approximately of 78.1% nitrogen ($N_2$) and 20.9% oxygen ($O_2$) per (dry) mole. Octane and ethanol are approximately 4.0 and 1.6 times as heavy as air respectively. When released in a vessel containing air, gaseous, heavier-than air, hydrocarbons like octane and ethanol will settle along the bottom of the vessel because of their relative weight, displacing some of the air from the vessel.

A preliminary novelty search in connection with this invention developed the following U.S. Pat. Nos. 3,368,326; 3,541,765; 3,572,013; 3,572,014; 3,747,303; and 4,279,630.

In general, those patents are illustrative of the use of activated carbon as an emission-control medium in association with an engine air cleaner that fits over and onto a carburetor, or throttle body, air inlet. Fuel vapors that may build up in the throat of the carburetor when the engine is not running will overflow the inlet and spill into the interior of the air cleaner housing. The vapors may be adsorbed by activated carbon present within the air cleaner housing, thereby preventing escape of adsorbed vapors to atmosphere. When the engine is running, the collected vapors may entrain with intake airflow to be subsequently combusted within the engine.

SUMMARY OF THE INVENTION

The present invention relates to novel engine intake systems, modules, and methods and involves the recognition that certain gaseous, heavier-than-air, hydrocarbons will fall to the lowest point of a vessel containing air to displace upwardly a similar volume of air. The invention embodies a geometry for an engine air intake system that provides a distinctive low feature, or pit, into which such hydrocarbons will fall and be collected so that their escape to the surrounding ambient atmosphere is avoided. A collection medium is disposed within the pit to collect the hydrocarbon vapors. By utilizing certain types of collection media, vapor collection may be encouraged by physical phenomena additional to collection by gravity. The use of activated carbon can aid collection by the presence of Van der Waals effect. While the gravity effect directs the hydrocarbons into the pit, the carbon itself attracts the molecules.

As such, the present invention is effective to capture certain hydrocarbon molecules that migrate upstream through an engine intake system when the engine is not running. One advantage of certain embodiments of the present invention is a reduction in hydrocarbon emissions without an accompanying restriction of airflow into the engine when running. Another advantage of certain embodiments is their inherent passivity, which does not require electrical or pneumatic connections, controls, or other devices for their effectiveness. Still another advantage is that vapor collection may be integrated with existing components, devices, and/or structures, such as a resonator for example, thereby making incorporation of the invention quite cost-efficient from the standpoint of both material usage and fabrication time.

Accordingly, one generic aspect of the invention relates to an engine intake system through which ambient air enters a combustion engine to be combusted with hydrocarbon fuel in combustion chamber space of the engine for running the engine. A walled main intake passageway has an upstream end communicated to ambient atmosphere and a downstream end communicated to the engine combustion chamber space. An imperforate walled pit encloses an interior space disposed at an elevation vertically below an imperforate wall of the main passageway. The pit has a first entrance communicating the interior space to ambient atmosphere and a second entrance communicating the interior space to the main intake passageway through the imperforate wall of the main passageway for enabling gaseous hydrocarbon that is heavier than air to fall into the interior space upon encountering the second entrance of the pit when migrating upstream within the main intake passageway toward the second entrance of the pit from the downstream end of the main passageway.

Another generic aspect relates to an engine intake system through which ambient air enters a combustion engine to be combusted with hydrocarbon fuel in combustion chamber space of the engine for running the engine. A walled main intake passageway has an upstream end communicated to ambient atmosphere and a downstream end communicated to the engine combustion chamber space. An imperforate walled pit encloses an interior space disposed at an elevation vertically below a bottom wall in the main passageway containing an entrance opening into the pit for enabling gaseous, heavier-than-air, hydrocarbon that is migrating upstream within the main intake passageway from the downstream end of the main passageway along the bottom wall toward the entrance opening to fall through the entrance opening into the pit upon encountering the entrance opening. A medium disposed within the interior space collects gaseous hydrocarbon that has fallen through the entrance opening into the pit.

Still another aspect relates to an engine intake system through which ambient air enters a combustion engine to be combusted with hydrocarbon fuel in combustion chamber space of the engine for running the engine. A walled main intake passageway has an upstream end communicated to ambient atmosphere and a downstream end communicated to the engine combustion chamber space. An imperforate walled resonator that is in communication with the main passageway tunes the intake system to the engine and includes an interior space disposed at an elevation vertically below a bottom wall in the main passageway containing an entrance opening into the interior space for enabling gaseous, heavier-than-air, hydrocarbon that migrates upstream within the main intake passageway from the downstream end of the main passageway along the bottom wall toward the entrance opening when the engine is not running to fall through the entrance opening into the interior space upon encountering the entrance opening. A medium disposed within the interior space collects gaseous hydrocarbon that has fallen through the entrance opening into the interior space.

Yet another generic aspect relates to an air intake module for a hydrocarbon-fueled combustion engine comprising a walled main intake passageway having an upstream end adapted to be communicated to ambient atmosphere and a downstream end adapted to be communicated to engine combustion chamber space. An imperforate walled pit that encloses an interior space is disposed at an elevation vertically below a bottom wall in the main passageway containing an entrance opening into the pit for enabling gaseous, heavier-than-air, hydrocarbon that migrates upstream within the main intake passageway from the downstream end of the main passageway along the bottom wall toward the entrance opening when the engine is not running to fall through the entrance opening into the pit upon encountering the entrance opening. A medium disposed within the interior space collects gaseous hydrocarbon that has fallen through the entrance opening into the pit.

BRIEF DESCRIPTION OF THE DRAWING

The accompanying drawings, which are incorporated herein and constitute part of this specification, includes a preferred embodiment of the invention, and together with a general description given above and a detailed description given below, serve to disclose principles of the invention in accordance with a best mode contemplated for carrying out the invention.

FIG. 1 is a diagram, generally schematic, demonstrating a physical principle involved in practice of the present invention.

FIG. 2 is a diagram, generally schematic, disclosing a first embodiment of the present invention.

DESCRIPTION OF THE PREFERRED EMBODIMENT

Figure 3:
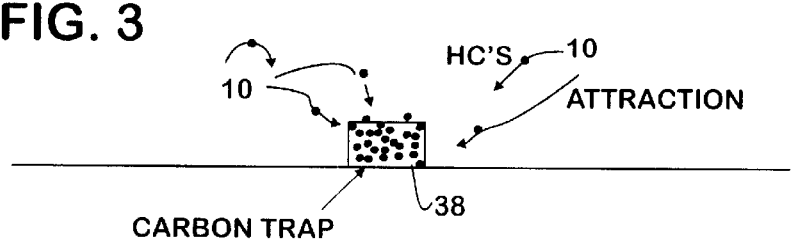
FIG. 3 is a diagram, generally schematic, demonstrating another physical principle that is involved in certain embodiments of the present invention.

FIG. 1 illustrates how gravity is involved in practice of the present invention. Gaseous, heavier-than-air, hydrocarbon 10 that is introduced into a vessel 12 containing air will fall to the lowest point in the vessel displacing air upwardly, as marked by arrow 14.

FIG. 2 discloses a first embodiment of the present invention utilizing the gravity effect shown in FIG. 1. An internal combustion engine 16 comprises an intake system 18 through which ambient air enters the engine for combustion with hydrocarbon fuel for running the engine. The fuel may be introduced by a fuel injection system that together with the intake system may be embodied, by way of example, as an air-fuel module 20. When engine 16 is naturally aspirated, the module acts as an induction system where engine vacuum inducts air and fuel into the individual engine cylinders.

Module 20 comprises a walled main intake passageway 22 that has an upstream end 24 communicated to ambient atmosphere and a downstream end 26 communicated to the engine combustion chamber space, typically through intake valves (not shown) that operate in suitably timed relation to engine operation. An imperforate walled pit 28, that may be integrally formed with module 20, encloses an interior space 30 disposed at an elevation vertically below an imperforate bottom wall 32 of main passageway 22. Pit 28 has a first entrance 34 communicating interior space 30 to ambient atmosphere and a second entrance 36 communicating interior space 30 to main intake passageway 22 through imperforate wall 32.

Entrance 34 comprises a hydrocarbon cleaning line, or conduit, 37 that runs from wall 32 to the bottom wall of pit 28. A suitable medium 38 for collecting hydrocarbon is disposed within interior space 30. An example of a suitable medium is activated carbon. The medium may occupy the entirety, or only a portion of interior space 30.

When engine 16 is running, atmospheric air is drawn through passageway 22 and into engine 10 where it forms, with injected fuel, a combustible mixture that is ignited to power the engine. The parallel path through line 37 and pit 28 imposes no significant restriction to the intake airflow.

When engine 16 stops running, certain hydrocarbons may be present in passageway 22 proximate engine 16, and they may tend to migrate upstream through passageway 22 along wall 32 toward upstream end 24. Upon encountering entrance 36 however, heavier-than-air hydrocarbons 10 will fall through into interior space 30. When they come in contact with medium 38, the molecules will be adsorbed by the medium. In this way, those molecules are collected and prevented from escaping to atmosphere, thereby preventing their emission to the environment.

It is believed unnecessary to provide any additional device to accomplish and/or facilitate such adsorption, thereby making the collection pit an entirely passive device. When activated carbon is used as the collection medium, the Van der Waals effect, mentioned earlier, can aid in the passive collection of the molecules. That effect is shown by FIG. 3.

When engine 16 is again run, a small amount of intake air may pass through cleaning line 37 to purge collected molecules from medium 38. As air passes across the medium, collected hydrocarbon molecules entrain with the air, and the mixture exits pit 28 through entrance 36 to re-enter the intake airflow through main passageway 22 and pass into engine 16.

Figure 4:
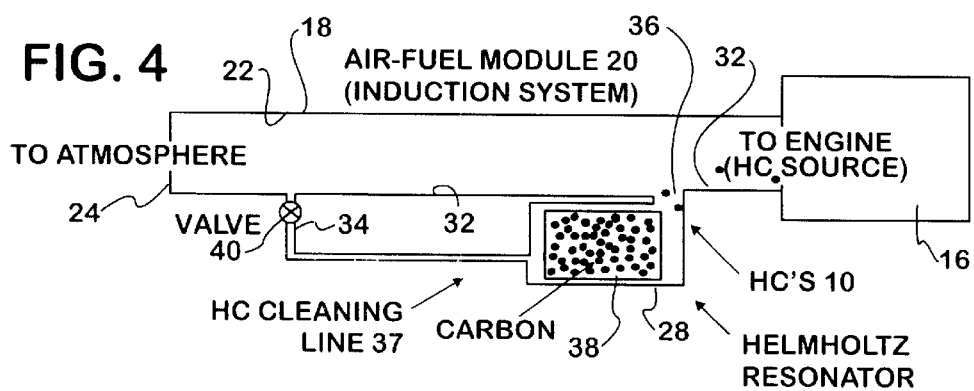
FIG. 4 is a diagram, generally schematic, disclosing a second embodiment of the present invention.

FIG. 4 discloses a second embodiment of the present invention that contains two additional inventive features. One feature is the presence of a valve 40 through which entrance 34 communicates with main passageway 22 and which is operable to selectively restrict communication of interior space 30 to ambient atmosphere via entrance 34. The second feature enables pit 28 to function as a Helmholtz resonator for flow through main passageway 22 when engine 16 is running. Entrance 36 comprises an orifice that has an effective transverse area for flow through itself chosen in relation to the volume of interior space 30 to be effective, when valve 40 is maximally restricting communication of interior space 30 to ambient atmosphere, to cause the pit to function as a Helmholtz resonator for flow through the main passageway when the engine is running.

A valve 40 that can selectively restrict flow can serve to tune the resonator to intake system 18. Active tuning can be accomplished by an actuator that is controlled by the engine control system to operate valve 40 to selectively restrict the pit to the ambient air entrance while the engine is running.

While the invention has been disclosed herein with reference to certain exemplary embodiments, it is to be understood that the invention may be practiced in various embodiments falling within the scope of the appended claims, and that certain specific words and phrases that have been used to describe a particular exemplary embodiment of the invention are not intended to necessarily limit the scope of the invention solely on account of such use.

What is claimed is:

1. An engine intake system through which ambient air enters a combustion engine to be combusted with hydrocarbon fuel in combustion chamber space of the engine for running the engine and which comprises:
a walled main intake passageway having an upstream end communicated to ambient atmosphere and a downstream end communicated to the engine combustion chamber space; and
an imperforate walled pit that encloses an interior space disposed at an elevation vertically below an imperforate wall of the main passageway, that has a first entrance communicating the interior space to ambient atmosphere, and that has a second entrance communicating the interior space to the main intake passageway through the imperforate wall of the main passageway for enabling gaseous hydrocarbon that is heavier than air to fall into the interior space upon encountering the second entrance of the pit when migrating upstream within the main intake passageway toward the second entrance of the pit from the downstream end of the main passageway.

2. An engine intake system as set forth in claim 1 wherein the first entrance communicates the interior space to ambient atmosphere through the imperforate wall of the main passageway at a location along the main passageway that is upstream of the location of the second entrance.

3. An engine intake system as set forth in claim 2 including a valve through which the first entrance communicates with the main passageway and which is operable to selectively restrict communication of the interior space to ambient atmosphere via the first entrance.

4. An engine intake system as set forth in claim 3 wherein the second entrance comprises an orifice that has an effective transverse area for flow through the second entrance chosen in relation to the volume of the interior space to be effective, when the valve is maximally restricting communication of the interior space to ambient atmosphere, to cause the pit to function as a Helmholtz resonator for flow through the main passageway when the engine is running.

5. An engine intake system as set forth in claim 4 including a medium disposed within the interior space for collecting gaseous hydrocarbon that has fallen into the pit.

6. An engine intake system as set forth in claim 3 including a medium disposed within the interior space for collecting gaseous hydrocarbon that has fallen into the pit.

7. An engine intake system as set forth in claim 2 including a medium disposed within the interior space for collecting gaseous hydrocarbon that has fallen into the pit.

8. An engine intake system as set forth in claim 1 including a medium disposed within the interior space for collecting gaseous hydrocarbon that has fallen into the pit.

9. An engine intake system as set forth in claim 1 including a valve through which the first entrance communicates with ambient atmosphere and which is operable to selectively restrict communication of the interior space to ambient atmosphere via the first entrance.

10. An engine intake system as set forth in claim 9 wherein the second entrance comprises an orifice that has an effective transverse area for flow through the second entrance chosen in relation to the volume of the interior space to be effective, when the valve is maximally restricting communication of the interior space to ambient atmosphere, to cause the pit to function as a Helmholtz resonator for flow through the main passageway when the engine is running.

11. An engine intake system as set forth in claim 10 including a medium disposed within the interior space for collecting gaseous hydrocarbon that has fallen into the pit.

12. An engine intake system as set forth in claim 9 including a medium disposed within the interior space for collecting gaseous hydrocarbon that has fallen into the pit.

13. An engine intake system through which ambient air enters a combustion engine to be combusted with hydrocarbon fuel in combustion chamber space of the engine for running the engine and which comprises:
a walled main intake passageway having an upstream end communicated to ambient atmosphere and a downstream end communicated to the engine combustion chamber space;
an imperforate walled pit that encloses an interior space disposed at an elevation vertically below a bottom wall in the main passageway containing an entrance opening into the pit for enabling gaseous, heavier-than-air, hydrocarbon that is migrating upstream within the main intake passageway from the downstream end of the main passageway along the bottom wall toward the entrance opening to fall through the entrance opening into the pit upon encountering the entrance opening, and;
and a medium disposed within the interior space for collecting gaseous hydrocarbon that has fallen through the entrance opening into the pit.

14. An engine intake system as set forth in claim 13 wherein the pit and the entrance opening are constructed and arranged to also function as a resonator for flow through the main passageway when the engine is running.

15. An engine intake system as set forth in claim 14 including an additional entrance opening into the pit and a valve that is operable to selectively restrict communication of the interior space to ambient atmosphere via the additional entrance opening.

16. An engine intake system as set forth in claim 13 including an additional entrance opening into the pit for communicating the interior space to ambient atmosphere via the additional entrance opening.

17. An engine intake system as set forth in claim 16 including a valve that is operable to selectively restrict communication of the interior space to ambient atmosphere via the additional entrance opening.

18. An engine intake system through which ambient air enters a combustion engine to be combusted with hydrocarbon fuel in combustion chamber space of the engine for running the engine and which comprises:

- a walled main intake passageway having an upstream end communicated to ambient atmosphere and a downstream end communicated to the engine combustion chamber space;
- an imperforate walled resonator that is in communication with the main passageway for tuning the intake system to the engine and that includes an interior space disposed at an elevation vertically below a bottom wall in the main passageway containing an entrance opening into the interior space for enabling gaseous, heavier-than-air, hydrocarbon that migrates upstream within the main intake passageway from the downstream end of the main passageway along the bottom wall toward the entrance opening when the engine is not running to fall through the entrance opening into the interior space upon encountering the entrance opening, and;
- and a medium disposed within the interior space for collecting gaseous hydrocarbon that has fallen through the entrance opening into the interior space.

19. An engine intake system as set forth in claim 18 wherein the entrance opening comprises an orifice that has an effective transverse area for flow through the entrance opening chosen in relation to the volume of the interior space to be effective to allow the interior space to function as a Helmholtz resonator for flow through the main passageway when the engine is running.

20. An air intake module for a hydrocarbon-fueled combustion engine comprising:

- a walled main intake passageway having an upstream end adapted to be communicated to ambient atmosphere and a downstream end adapted to be communicated to engine combustion chamber space;
- an imperforate walled pit that encloses an interior space disposed at an elevation vertically below a bottom wall in the main passageway containing an entrance opening into the pit for enabling gaseous, heavier-than-air, hydrocarbon that migrates upstream within the main intake passageway from the downstream end of the main passageway along the bottom wall toward the entrance opening when the engine is not running to fall through the entrance opening into the pit upon encountering the entrance opening, and;
- and a medium disposed within the interior space for collecting gaseous hydrocarbon that has fallen through the entrance opening into the pit.

21. An air intake module as set forth in claim 20 wherein the pit and the entrance opening are constructed and arranged to also function as a resonator for flow through the main passageway.

22. An air intake module as set forth in claim 21 including an additional entrance opening into the pit and a valve that is operable to selectively restrict communication of the interior space to ambient atmosphere via the additional entrance opening.

23. An air intake module as set forth in claim 22 wherein the additional entrance opening communicates the interior space to ambient atmosphere through a wall of the main passageway at a location along the main passageway that is upstream of the location of the first-mentioned entrance opening along the main passageway.

24. An air intake module as set forth in claim 20 including an additional entrance opening to the pit for communicating the interior space to ambient atmosphere via the additional entrance opening.

25. An air intake module as set forth in claim 24 including a valve that is operable to selectively restrict communication of the interior space to ambient atmosphere via the additional entrance opening.

* * * * *